United States Patent [19]
Cerboni

[11] Patent Number: 5,534,283
[45] Date of Patent: Jul. 9, 1996

[54] METHOD FOR POURING QUANTITIES OF CHOCOLATE INTO MOLDS

[75] Inventor: Renzo Cerboni, Milan, Italy

[73] Assignee: Carle & Montanari S.p.A., Milan, Italy

[21] Appl. No.: 238,688

[22] Filed: May 5, 1994

[30] Foreign Application Priority Data

May 6, 1993 [IT] Italy .................................. MI93A0911

[51] Int. Cl.[6] ................................................... A23G 1/00
[52] U.S. Cl. .......................................... 426/515; 426/660
[58] Field of Search ..................................... 426/512, 515, 426/660, 631; 425/134

[56] References Cited

U.S. PATENT DOCUMENTS 4,229,484  10/1980  Steels et al. ............................ 426/515
4,588,599   5/1986  Cerboni ................................... 426/660

Primary Examiner—George Yeung
Attorney, Agent, or Firm—Kirschstein et al.

[57] ABSTRACT

Method of pouring a liquid mass of chocolate into an elongated mold by depositing greater quantities of the mass at both shorter end regions of the mold, and by depositing a lesser quantity of the mass at a longer central region of the mold.

5 Claims, 3 Drawing Sheets

METHOD FOR POURING QUANTITIES OF CHOCOLATE INTO MOLDS

BACKGROUND OF THE INVENTION

The present invention relates to a method and to an apparatus for pouring quantities of chocolate into forming molds.

The introduction of quantities of chocolate into molds for the production of bars of different sizes by a "tongue" pouring method is known in the art.

For this purpose a molding machine which translates relative to the mold and so deposits a "tongue" of pasty product in the wells of the mold, is used.

With this method of pouring, it is possible to deposit in the wells of the molds mixtures composed of chocolate and solid ingredients such as hazel nuts or almonds which are present in the premixed mass.

The "tongue" pouring method has great technical advantages. However, when producing chocolate bars with large surface areas difficulties are encountered with regard to the uniformity of the thickness of the layer forming the bar, owing to the fact that with the "tongue" pouring method it is not possible to deposit the product accurately in the immediate vicinity of the outer edges of the well, in case the molds are soiled by the product.

Consequently, when beating the mold it is not possible to guarantee that the product poured into the well will reach the four corners of the bar evenly and accurately. Convex or conical products are often created or bars are made with imperfectly formed corners.

This problem is an esthetic defect, and in addition, as the bars are not of uniform thickness, they can create operating problems in the wrapping machine which comes next.

SUMMARY OF THE INVENTION

It is therefore an object of the present invention to propose a method and corresponding apparatus by means of which the problems of the prior art can be eliminated and a bar of chocolate of uniform thickness and perfectly formed angles can be produced.

This object is achieved according to the present invention by a method in which the chocolate is deposited in quantitatively different ways along the axis of the mold.

It is particularly advantageous for a larger quantity to be deposited at the beginning and at the end of the mold well, while a smaller quantity will be deposited in the middle of the well.

For this purpose it is advantageous to vary the rate of flow through the chocolate feeding apparatus in a controlled manner.

It is also advantageous to vary the speed of translation of the pouring apparatus relative to the mold in a controlled manner.

The apparatus capable of carrying out the method proposed by the present invention is characterized by the fact that the drive means of the chocolate feeding pump, and the drive means for translating the pouring apparatus, are controllable motors connected functionally to a numerical control apparatus.

By making it possible for the product to be fed in quantitatively different ways to the mold, it will be possible to feed—for example at the beginning of the well—a larger quantity of product, followed by a smaller quantity of product, and again at the end of the mold well to feed a larger quantity of product.

With the additional possibility of adjusting the speed of translation of the pouring apparatus, it will also be possible to determine how locally to distribute the "tongue" of the chocolate mass along the mold well.

BRIEF DESCRIPTION OF THE DRAWINGS

The subject designed according to the present invention will now be described in greater detail and illustrated in the accompanying drawings, in which.

DETAILED DESCRIPTION OF THE PREFERRED EMBODIMENT

Figure 1:
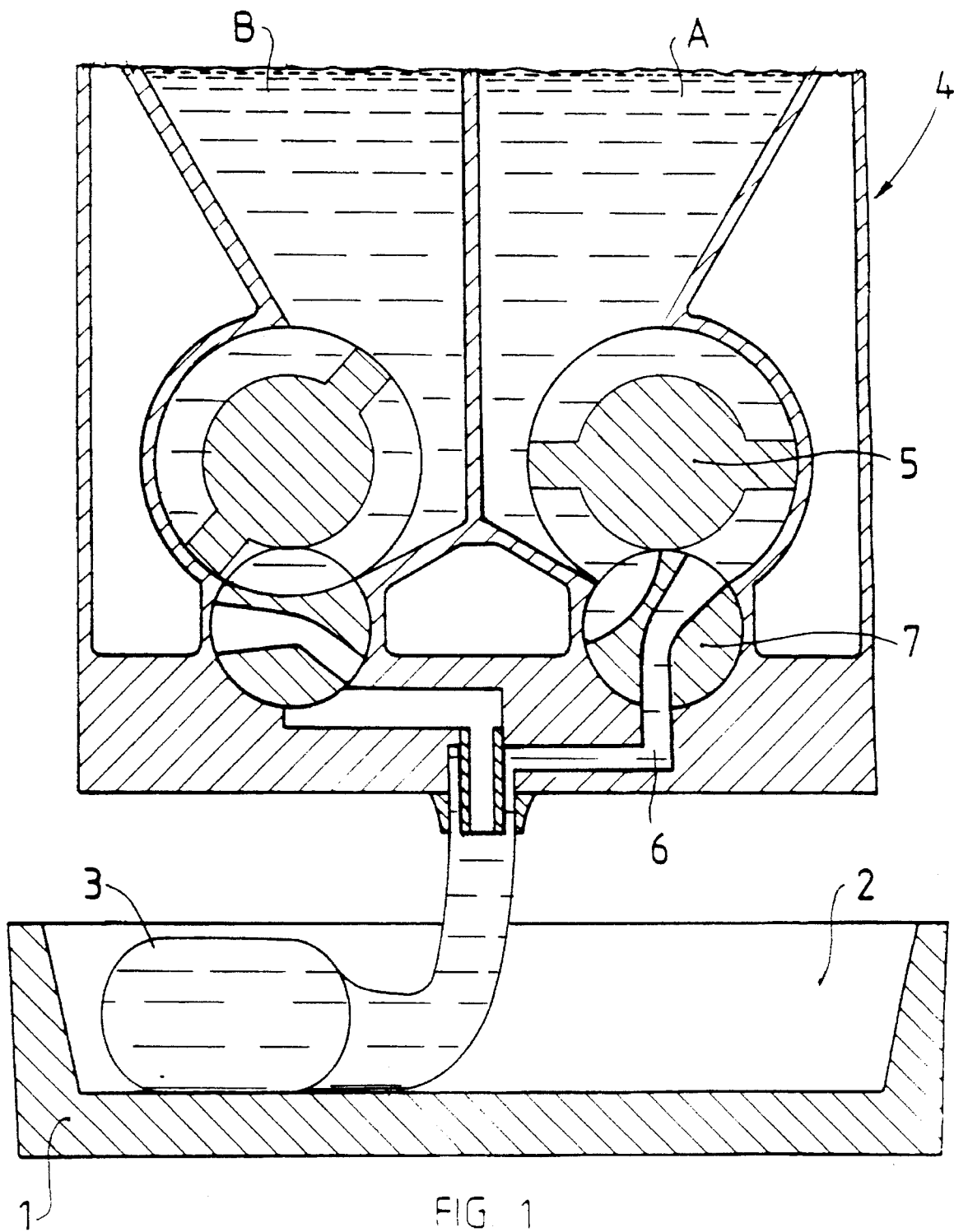
FIG. 1 shows diagrammatically a mold positioned underneath a feeding unit of a molding machine.

As can be seen in FIG. 1, the mold 1, which has a well 2 for filling with chocolate 3, is positioned underneath a translatable pouring unit 4 which forms part of a molding machine.

In the case illustrated, the well 2 can be filled with a product (A) and with a product (B). In the present case the following description will concern only the manner in which it is filled with the product (A).

In order to feed the product (A) in a measured manner into the well 2 of the mold 1, there is provided, in the bottom of the apparatus 4 a means such as a bladed wheel 5, which as it rotates conveys the product (A) toward the well 2.

The feed channel 6 can be intercepted by a valve 7 which is known in the prior art.

Figure 2:
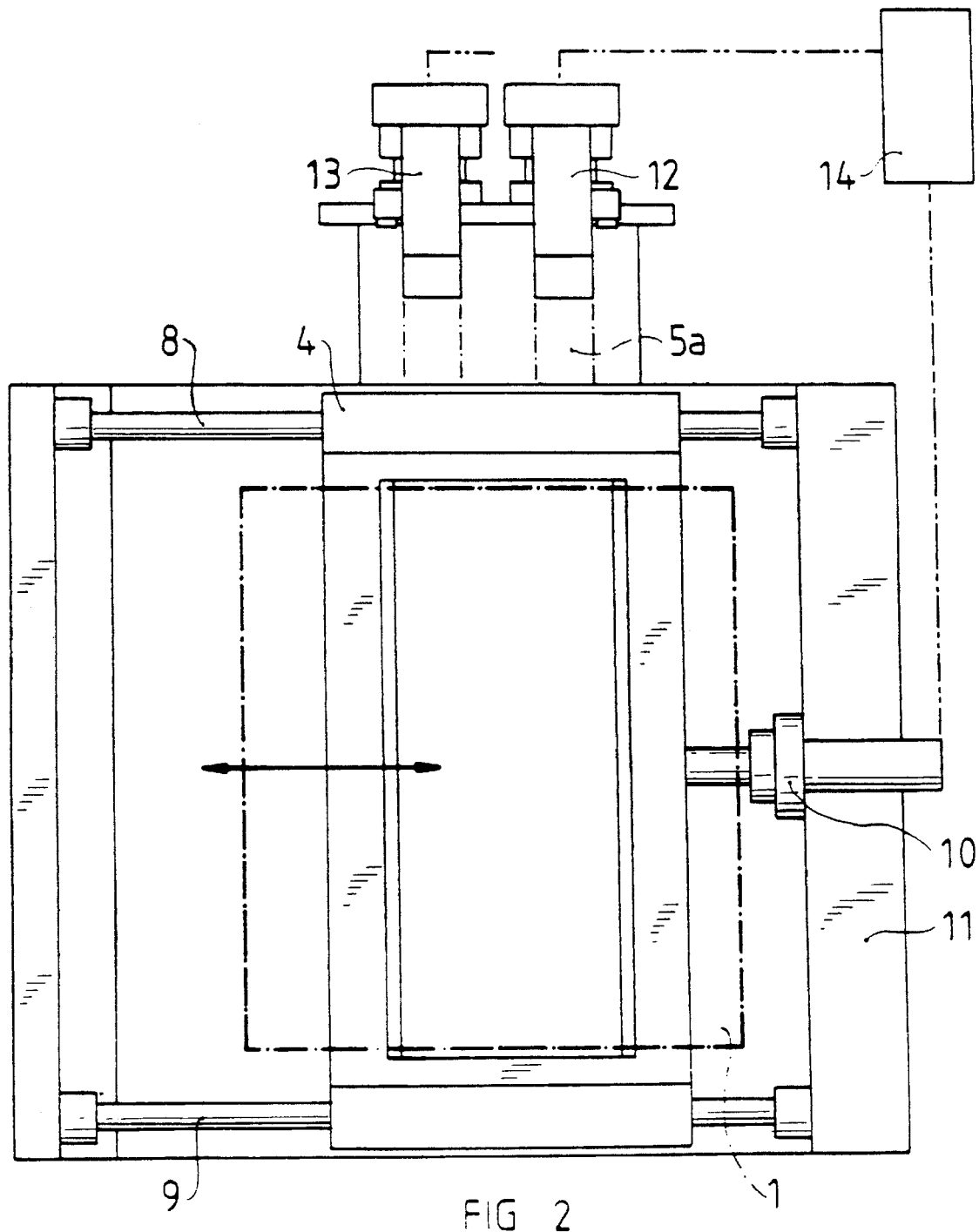
FIG. 2 shows diagrammatically a plan view of the molding machine.

As can be seen in FIG. 2, the product feeding unit 4 is supported over a mold 1 which is in a fixed position, and the feeding unit 4 is supported in such a way that it can be translated by parallel guides 8 and 9 located above the surface on which the mold 1 is held.

In order to move the feeding unit, this unit is connected functionally to a drive motor 10 mounted on a frame 11 holding the parallel guides 8 and 9.

The motor 10 is advantageously constructed as a controllable motor (using e.g. a direct current motor) which will allow the pouring unit 4 to be displaced at a controlled and predeterminable speed relative to the mold 1.

The shaft 5a of the bladed wheel 5 responsible for feeding the product (A) into the well 2 of the mold 1, is also connected to a controllable motor 12, advantageously a direct current motor.

Both the controllable motor 10 and the controllable motor 12 are connected to a numerical control rig shown at 14.

Figure 3:
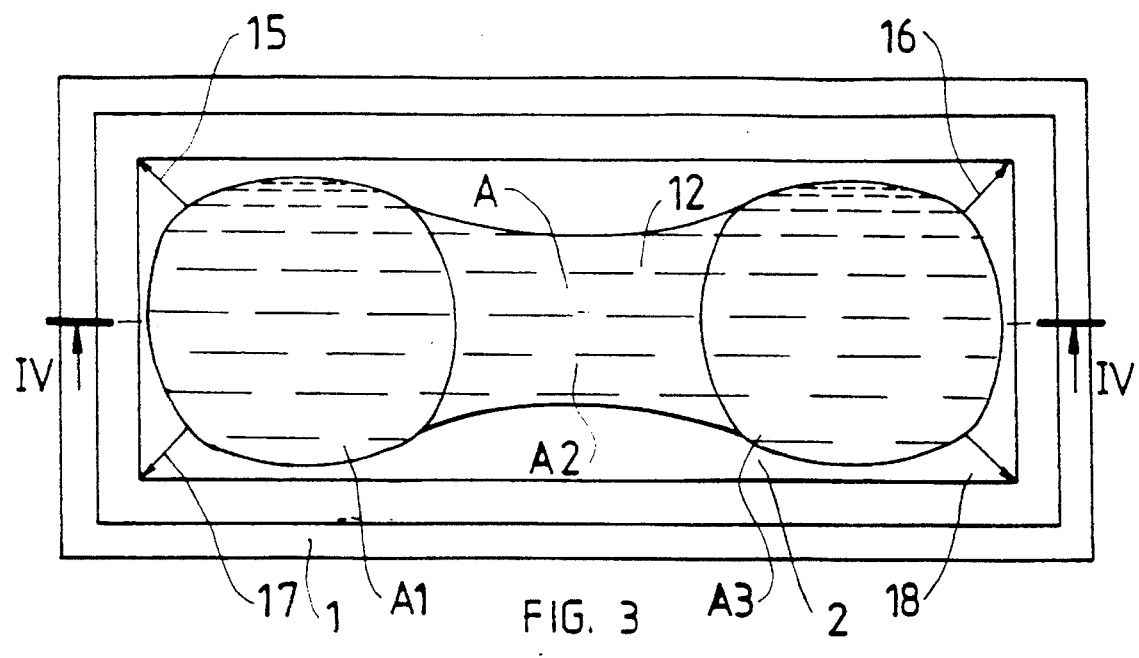
FIG. 3 shows diagrammatically a plan view of a well of a mold.

Owing to the possibility of varying the drive speed of the motor 10 and that of the motor 12, it becomes possible to deposit the chocolate mass (A) in different quantities in the well 2 of the mold 1, as illustrated diagrammatically in FIGS. 3.and 4. For this purpose all that is required is to run the motors 12 and 10 at different and controlled speeds.

Figure 4:
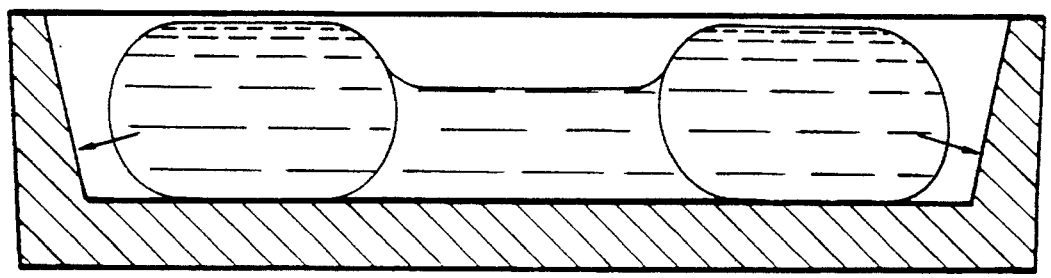
FIG. 4 shows the mold in section through the line IV–IV marked FIG. 3.

As can be seen in FIGS. 3 and 4 it will be possible to deposit a larger quantity of product (A1) at the beginning of the well, then to deposit a smaller quantity (A2) and lastly, at the end of the well 2 once again to deposit a larger quantity (A3) of product. The depositing of larger quantities of chocolate mass A1 and A3 at the beginning and end of the well 2 (corners) generates a greater static pressure because of the accumulations of material A1 and A3, thus helping to fill the corners 15, 16, 17 and 18 of the well perfectly as indicated diagrammatically by the arrows in FIG. 3.

Figure 5:
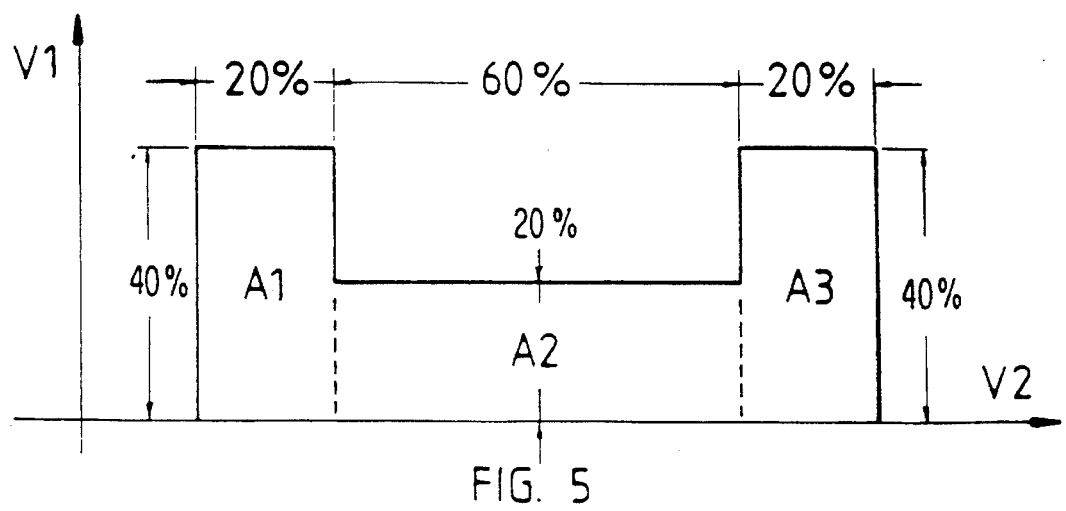
FIG. 5 shows a quantitative diagram of the pouring stage during the filling of a well.

FIG. 5 gives a diagram of the quantitative distribution of product A1, A2 and A3 along the axis of the mold in accordance with the speed at which the motors 10, 12 are run. This shows that by varying the speed of the motor 12 which drives the product feeding pump it will be possible to vary the quantity of product fed into areas A1, A2 and A3.

By varying the speed of the drive motor 10 used to translate the molding unit marked 4, it will be possible to vary the width of the accumulations of material A1, A2 and A3 along the axis of the mold well.

It is important that the quantitative feeding to each well 2 correspond 100%, that is to the weight of the finished bar.

I claim:

1. A method of pouring a liquid mass of chocolate into a mold extending along a longitudinal axis, comprising the sequential steps of:

a) depositing a first quantity of the mass along a first, longitudinal distance at one end region of the mold;

b) depositing a second quantity of the mass along a second longitudinal distance at an intermediate region of the mold; and c) depositing a third quantity of the mass along a third longitudinal distance at an opposite end region of the mold;

d) said steps a) and c) being performed by depositing said first and third quantities in individual amounts greater than said second quantity;

e) said step b) being performed by depositing said second quantity over said second distance which is longer than either one of said first and third distances.

2. The method of claim 1, wherein steps a) and c) are performed by depositing the same quantity of the mass at said end regions of the mold.

3. The method of claim 2, wherein either one of said first and third quantities is twice as much as said second quantity.

4. The method of claim 1, wherein step b) is performed by depositing the second quantity over said second distance which is three times longer than either one of said first and third distances.

5. The method of claim 1, wherein said steps a), b) and c) are performed while performing a relative motion along the longitudinal axis between the mold and the mass.

* * * * *